(12) United States Patent
Gette et al.

(10) Patent No.: US 6,276,201 B1
(45) Date of Patent: Aug. 21, 2001

(54) FUEL TANK FOR A MOTOR VEHICLE

(75) Inventors: Christophe Gette, Luneville; Stéphane Bouton, Pontpierre, both of (FR); Otto Korst, Herschbach (GB)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/396,718

(22) Filed: Sep. 15, 1999

(30) Foreign Application Priority Data

Sep. 16, 1998 (GB) .............................. 198 42 336

(51) Int. Cl.⁷ .......................... G01F 23/32; G01F 23/30; B65D 6/00; F04B 17/00
(52) U.S. Cl. .................. 73/317; 73/313; 73/305; 220/4.12; 220/4.14; 417/423.1
(58) Field of Search ................ 73/305, 313, 317, 73/318; 220/4.12, 4.13, 4.14, 4.21–4.25, 734; 417/423.1, 423.14

(56) References Cited

U.S. PATENT DOCUMENTS

| | | | |
|---|---|---|---|
| 3,756,080 | * | 9/1973 | Pringle .............................. 73/290 R |
| 5,140,303 | * | 8/1992 | Meyer ................................ 340/450.2 |
| 5,301,550 | * | 4/1994 | Shortis ................................ 73/322.5 |
| 5,752,409 | * | 5/1998 | Lippmann et al. ................. 73/290 R |
| 5,765,435 | * | 6/1998 | Grotschel et al. ...................... 73/313 |

FOREIGN PATENT DOCUMENTS

| | | |
|---|---|---|
| 4411961 | 12/1995 | (DE) . |
| 4433301A1 | 3/1996 | (DE) . |
| 19528182A1 | 2/1997 | (DE) . |
| 0597581A1 | 5/1994 | (EP) . |
| 0799990A2 | 10/1997 | (EP) . |
| 2661498 | 10/1991 | (FR) . |
| 99116442 | 2/2001 | (WO) . |

* cited by examiner

*Primary Examiner*—Hezron Williams
*Assistant Examiner*—Dennis Loo
(74) *Attorney, Agent, or Firm*—Mayer, Brown & Platt

(57) ABSTRACT

In a fuel tank (1) for a motor vehicle, a carrier (12) of a fuel level sensor (8) is manufactured in one piece with a wall of the baffle (4). As a result, the fuel tank (1) is composed of a very small number of components and can be mounted in a particularly simple way. In the region of a mounting for a lever arm (9) carrying a float (10), the carrier (12) is spaced from the baffle (4). The lever arm (9) can thereby engage round the mounting. The filling level sensor (8) has high stability as a result.

25 Claims, 2 Drawing Sheets

FUEL TANK FOR A MOTOR VEHICLE

BACKGROUND

1. Field of the Invention

This invention relates generally to fuel tanks for motor vehicles, and particularly to a fuel tank having a baffle arranged at the bottom part of the fuel tank and having a fuel level sensor for determining the fuel level in the fuel tank, the fuel level sensor having a lever arm pivotally mounted on a carrier and carrying a float.

2. Related Art

It is known to produce fuel tanks from plastic using the injection molding method or the blowing method. Such a prior fuel tank has arranged within the fuel tank, inter alia, a feed unit, through which fuel is fed out of the fuel tank and into an internal combustion engine. The feed unit possesses a baffle in which a fuel pump is located. The fuel level sensor is generally substantially preassembled, and is inserted into the fuel tank after the fuel tank is produced. The carrier of the fuel level sensor has latching hooks, through which the sensor can be snapped on correspondingly designed hooks contained on the wall of the fuel tank.

The disadvantage of such prior fuel tanks is that they consist of a large number of components which have to be mounted. The fuel tanks therefore require complicated logistics to keep particular components in stock and require a cost-intensive mounting procedure.

It is therefore an object of the present invention to provide a fuel tank produced from plastic using the injection molding method or the blowing method in such a way that the fuel tank including the fuel level sensor can be produced as cost-effectively as possible.

SUMMARY OF THE PRESENTLY PREFERRED EMBODIMENT

According to a preferred embodiment of the present invention, the carrier is designed to be in one piece with a wall of the baffle or with another feed unit component prestressed against the bottom of the fuel tank. This allows the fuel tank according to the present invention to have a particularly small number of components. The lever arm of the fuel level sensor can thereby be inserted directly into the fuel tank or be fastened to the feed unit before the latter is mounted in the fuel tank. Designing the carrier in one piece with the baffle or with a component of the feed unit allows the manufacture of the fuel tank according to the present invention to be simplified, since latching hooks or the like for fastening the carrier are not necessary. The manufacture of the fuel tank becomes particularly cost-effective as a result.

According to another advantageous development of the invention, it is possible in a simple way to ensure the lever arm engages round in the region of its mounting on the carrier if a mounting for the lever arm is spaced from the baffle or another component of the feed unit. The fuel level sensor has very high mechanical stability by virtue of this design.

The pivot angle of the lever arm depends on the fuel level in the fuel tank and is detected by a potentiometer of the fuel level sensor. According to another advantageous development of the invention, electric leads for the fuel level sensor can be laid in a simple way if clamping devices for securing electric leads are arranged on the carrier.

In the preferred embodiment, the lever arm usually carries sliding contacts of the potentiometer. Consequently, when the lever arm is pivoted, the sliding contacts slide over sliding tracks arranged on the carrier. According to another advantageous development of the invention, it is particularly simple to fasten the sliding tracks of the potentiometer if the carrier has guide elements for engaging over a holding part carrying a sliding track of the potentiometer.

According to another advantageous development of the invention, the mounting of the potentiometer on the carrier of the fuel level sensor is further simplified if the holding part carrying the sliding track is prestressed against a stop by spring elements manufactured in one piece with the carrier.

The holding part of the potentiometer could, for example, be screwed together with the carrier. However, the number of components of the fuel tank is further reduced according to the invention if the carrier has resilient latching hooks engaging behind the holding part.

These and other features and advantages of the invention will be apparent upon consideration of the following detailed description of the preferred embodiments of the invention, taken in conjunction with the appended drawing.

DETAILED DESCRIPTION OF THE PRESENTLY PREFERRED EMBODIMENT

Figure 1:
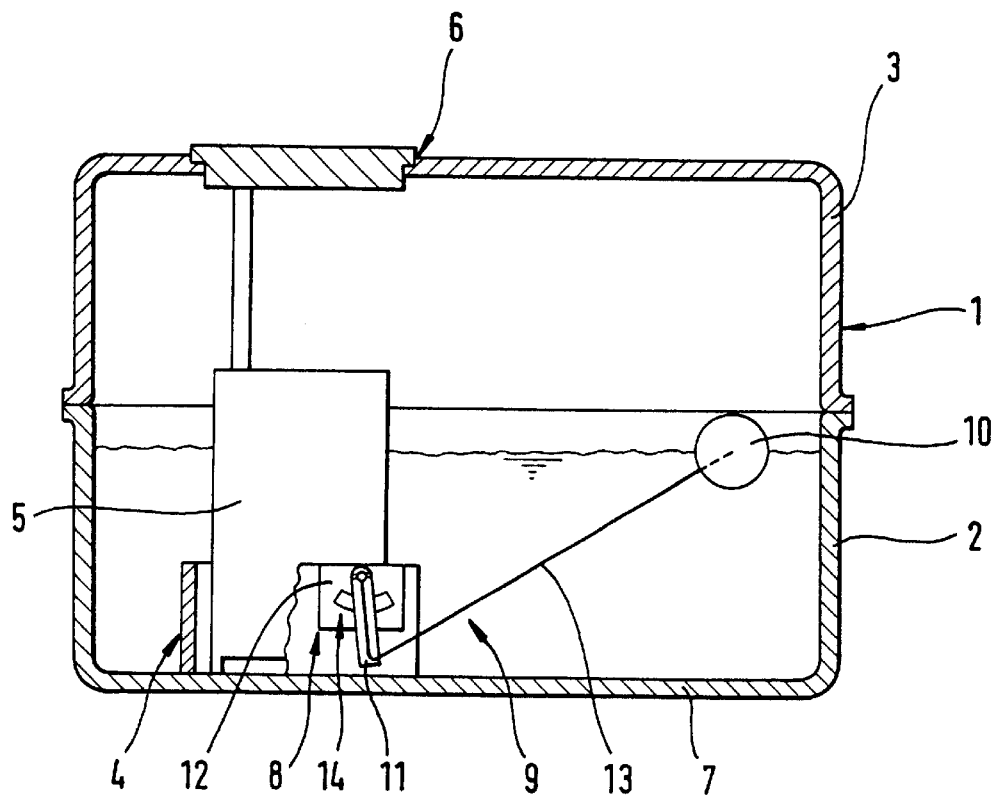
FIG. 1 is a cross-section of a fuel tank having a fuel level sensor according to a preferred embodiment of the present invention.

Referring to FIG. 1, a fuel tank 1 manufactured from plastic by injection molding according to a preferred embodiment of the present invention is shown. The fuel tank 1 is composed of two half shells 2, 3 welded to one another and has a baffle 4 in its bottom region. The upper half shell 3 has an orifice 6 provided for introducing a feed unit 5 into the fuel tank 1. The feed unit 5 is prestressed against the bottom 7 of the fuel tank 1 and sucks in fuel from the baffle 4. Moreover, the fuel tank 1 has a fuel level sensor 8 with a float 10 fastened to the lever arm 9. The lever arm 9 is pivotally mounted by means of a plastic clip 11 on the carrier 12 fastened to the outside of the baffle 4 and carries the float 10 by means of a clip wire 13. The float 10 follows a fuel level in the fuel tank 1 and pivots the lever arm 9. The pivot angle of the level arm 9 is detected by a potentiometer 14.

Figure 2:
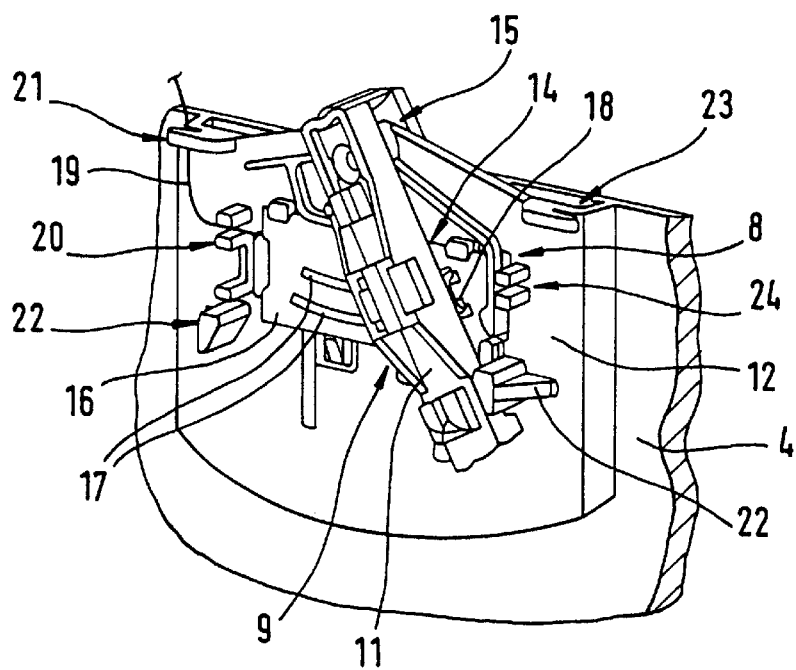
FIG. 2 is a perspective illustration of a fuel level sensor according to a preferred embodiment of the present invention.

Referring now to FIG. 2, an enlarged perspective illustration of the components of the fuel level sensor 8 which are arranged on the baffle 4 according to a preferred embodiment of the present invention is shown. To simplify the drawing, the clip wire 13 from FIG. 1 is not illustrated. The carrier 12 of the fuel level sensor 8 is manufactured in one piece with the baffle 4. The carrier 12 is spaced from the baffle 4 in the region of a mounting 15 for the lever arm 9. The plastic clip 11 of the lever arm 9 can thereby engage behind the carrier 4. The fuel level sensor 8 has high stability as a result. The potentiometer 14 has two sliding tracks 17 arranged on a holding part 16 of the carrier 12. A double contact 18 fastened to the plastic clip 11 slides over the sliding tracks 17. The fuel level sensor 8 is connected via electric leads 19 to a motor vehicle power system which is not illustrated. The electric leads 19 are held by clamping devices 20, 21 manufactured in one piece with the carrier 12 of the fuel level sensor 8. Further clamping devices 23, 24, for example for a fuel level limit switch not illustrated, are arranged on the carrier 12. Stops 22 serve for limiting the pivoting movement of the plastic clip 11. At the same time, the left stop 22, together with the clamping device 20, likewise makes it possible to hold the electric leads 19.

Figure 3:
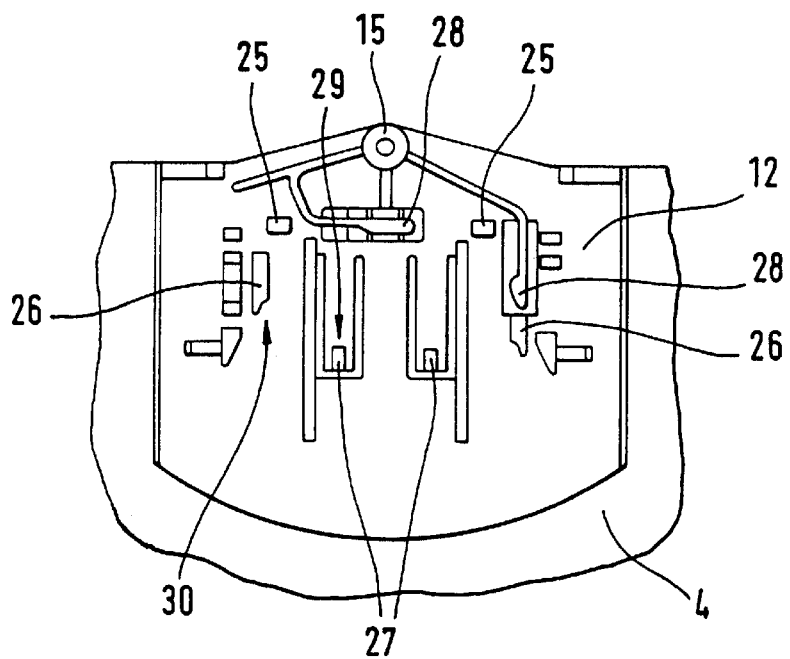
FIG. 3 is a diagram of a fuel level sensor according to a preferred embodiment of the present invention.

Referring now to FIG. 3, a front view of the carrier 12 of the fuel level sensor 8 according to a preferred embodiment of the present invention is shown. For simplification, the plastic clip 11 and the holding part 16, together with the sliding tracks 17, from FIG. 2 are not illustrated. Guide elements 25, 26, latching hooks 27 and spring elements 28 are manufactured in one piece with the carrier 12. The guide elements 25, 26 serve for simplifying the mounting of the holding part 16 illustrated in FIG. 2 and, in the mounted position, engage over the latter. The latching hooks 27 secure the holding part 16 against falling out. The spring elements 28 prestress the holding part 16 against stops 29, 30 arranged in the guide elements 25, 26 and on the latching hooks 27.

It is to be understood that a wide range of changes and modifications to the embodiments described above will be apparent to those skilled in the art and are contemplated. It is, therefore, intended that the foregoing detailed description be regarded as illustrative rather than limiting, and that it be understood that it is the following claims, including all equivalents, that are intended to define the spirit and scope of the invention.

What is claimed is:

1. A fuel tank for a motor vehicle having a baffle within which a fuel pump is disposed, wherein the baffle is prestressed against the bottom region of the fuel tank, and further having a fuel level sensor for determining a level of fuel in the fuel tank, the fuel level sensor having a lever arm pivotally mounted on a carrier and carrying a float, wherein the carrier is formed as a single piece with a wall of the baffle.

2. The fuel tank as claimed in claim 1, wherein a mounting for the lever arm is spaced from the baffle.

3. The fuel tank as claimed in claim 1, wherein one or more clamping devices for securing electric leads are arranged on the carrier.

4. The fuel tank as claimed in claim 1, wherein the carrier has one or more guide elements for engaging over a holding part carrying a sliding track of a potentiometer.

5. The fuel tank as claimed in claim 4, wherein the holding part carrying the sliding track is prestressed against one or more stops by one or more spring elements manufactured in one piece with the carrier.

6. The fuel tank as claimed in claim 1, wherein the carrier has one or more resilient latching hooks that engage the lever arm.

7. A fuel tank for a motor vehicle having a feed unit arranged in the bottom region of the fuel tank and having a fuel level sensor for determining a level of fuel in the fuel tank, the fuel level sensor having a lever arm pivotally mounted on a carrier and carrying a float, wherein the carrier is formed as a single piece with a component of a feed unit, said component being prestressed against the bottom of the fuel tank.

8. The fuel tank as claimed in claim 7, wherein a mounting for the lever arm is spaced from the component of the feed unit.

9. The fuel tank as claimed in claim 7, wherein one or more clamping devices for securing electric leads are arranged on the carrier.

10. The fuel tank as claimed in claim 7, wherein the carrier has one or more guide elements for engaging over a holding part carrying a sliding track of a potentiometer.

11. The fuel tank as claimed in claim 10, wherein the holding part carrying the sliding track is prestressed against one or more stops by one or more spring elements manufactured in one piece with the carrier.

12. The fuel tank as claimed in claim 7, wherein the carrier has one or more resilient latching hooks that engage the lever arm.

13. A fuel tank for a motor vehicle comprising:

an upper half shell;

a lower half shell coupled with the upper half shell;

a baffle within which a fuel pump is disposed, wherein the baffle is prestressed against the lower half shell;

a fuel level sensor having a lever arm pivotally mounted on a carrier and carrying a float wherein the carrier and the baffle are formed as a single piece.

14. The fuel tank as claimed in claim 13, wherein the lever arm is mounted apart from the baffle.

15. The fuel tank as claimed in claim 13, wherein one or more clamping devices for securing electric leads are coupled with the carrier.

16. The fuel tank as claimed in claim 13, wherein a plastic clip is attached to the lever arm.

17. The fuel tank as claimed in claim 16, wherein a double contact is coupled to the plastic clip and said double contact engages a sliding track of a potentiometer.

18. A fuel tank for a motor vehicle, with a baffle arranged in its bottom region and with a fuel level sensor for determining a level of fuel in the fuel tank, the fuel level sensor having a lever arm pivotally mounted on a carrier and carrying a float, wherein the carrier is designed in one piece with a wall of the baffle and the carrier has one or more guide elements for engaging over a holding part carrying a sliding track of a potentiometer and further wherein the holding part is prestressed against one or more stops by one or more spring elements manufactured in one piece with the carrier.

19. The fuel tank as claimed in claim 18, wherein a mounting for the lever arm is spaced from the baffle.

20. The fuel tank as claimed in claim 18, wherein one or more clamping devices for securing electric leads are arranged on the carrier.

21. The fuel tank as claimed in claim 18, wherein the carrier has one or more resilient latching hooks that engage the lever arm.

22. A fuel tank for a motor vehicle, with a feed unit arranged in its bottom region and with a fuel level sensor for determining a level of fuel in the fuel tank, the fuel level sensor having a lever arm pivotally mounted on a carrier and carrying a float, wherein the carrier is designed in one piece with a component of a feed unit, said component being prestressed against the bottom of the fuel tank and wherein the carrier has one or more guide elements for engaging over a holding part carrying a sliding track of a potentiometer, and further wherein the holding part carrying the sliding track is prestressed against one or more stops by one or more spring elements manufactured in one piece with the carrier.

23. The fuel tank as claimed in claim 22, wherein a mounting for the lever arm is spaced from the component of the feed unit.

24. The fuel tank as claimed in claim 22, wherein one or more clamping devices for securing electric leads are arranged on the carrier.

25. The fuel tank as claimed in claim 22, wherein the carrier has one or more resilient latching hooks that engage the lever arm.

* * * * *